(12) United States Patent
Nakayama

(10) Patent No.: US 10,071,343 B2
(45) Date of Patent: Sep. 11, 2018

(54) ELECTRICALLY HEATED CATALYST DEVICE AND ITS MANUFACTURING METHOD

(71) Applicant: TOYOTA JIDOSHA KABUSHIKI KAISHA, Toyota-shi, Aichi (JP)

(72) Inventor: Masao Nakayama, Nagoya (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 103 days.

(21) Appl. No.: 15/031,382

(22) PCT Filed: Oct. 8, 2014

(86) PCT No.: PCT/JP2014/005129
§ 371 (c)(1),
(2) Date: Apr. 22, 2016

(87) PCT Pub. No.: WO2015/083313
PCT Pub. Date: Jun. 11, 2015

(65) Prior Publication Data
US 2016/0271561 A1    Sep. 22, 2016

(30) Foreign Application Priority Data

Dec. 4, 2013    (JP) .................................. 2013-251128

(51) Int. Cl.
*F01N 3/10* (2006.01)
*B01D 53/94* (2006.01)
(Continued)

(52) U.S. Cl.
CPC ....... *B01D 53/9454* (2013.01); *F01N 3/2026* (2013.01); *F01N 3/2853* (2013.01);
(Continued)

(58) Field of Classification Search
CPC ...... F01N 13/18; F01N 3/2026; F01N 3/2853; F01N 2350/04; Y02T 10/22
(Continued)

(56) References Cited

U.S. PATENT DOCUMENTS

2005/0048807 A1*  3/2005  Li ......................... H01L 21/486
                                                         439/66
2013/0259754 A1  10/2013  Murata et al.
2015/0247436 A1   9/2015  Nakayama et al.

FOREIGN PATENT DOCUMENTS

CN       103237964 A     8/2013
JP       2002-231564 A   8/2002
(Continued)

OTHER PUBLICATIONS

International Search Report for PCT/JP2014/005129 dated Jan. 13, 2015 [PCT/ISA/210].

*Primary Examiner* — Tom P Duong
(74) *Attorney, Agent, or Firm* — Sughrue Mion, PLLC

(57) ABSTRACT

An electrically heated catalyst device 100 according to an aspect of the present invention includes a catalyst support 20 supporting a catalyst thereon, a thin plate-like wiring line member 40 fixed on an outer circumferential surface of the catalyst support 20, an outer cylinder 70 with an opening 71 formed on its side, the outer cylinder 70 covering the outer circumferential surface of the catalyst support 20, the opening 71 being configured for externally pulling out the wiring line member 40, and a holding member 60, the holding member 60 filling up space between the catalyst support 20 and the outer cylinder 70 and thereby holding the catalyst support 20, in which the catalyst support 20 is electrically heated through the wiring line member 40. A pull-out part 43 of the wiring line member 40 pulled out through the opening 71 is formed in an accordion shape.

6 Claims, 8 Drawing Sheets

(51) Int. Cl.
*F01N 3/20* (2006.01)
*F01N 3/28* (2006.01)
*F01N 13/18* (2010.01)

(52) U.S. Cl.
CPC .......... *F01N 13/18* (2013.01); *F01N 2350/04* (2013.01); *Y02T 10/22* (2013.01); *Y02T 10/26* (2013.01)

(58) Field of Classification Search
USPC .................................. 422/174, 180; 29/890
See application file for complete search history.

(56) References Cited

FOREIGN PATENT DOCUMENTS

| JP | 2012-66188 A | | 4/2012 |
|---|---|---|---|
| JP | 2012-112302 A | | 6/2012 |
| JP | 2012112302 A | * | 6/2012 |
| JP | 2013-136997 A | | 7/2013 |
| JP | 2013-181413 A | | 9/2013 |
| JP | 2014-105694 A | | 6/2014 |

* cited by examiner

ELECTRICALLY HEATED CATALYST DEVICE AND ITS MANUFACTURING METHOD

CROSS REFERENCE TO RELATED APPLICATIONS

This application is a National Stage of International Application No. PCT/JP2014/005129, filed on Oct. 8, 2014, which claims priority from Japanese Patent Application No. 2013-251128, filed on Dec. 4, 2013, the contents of all of which are incorporated herein by reference in their entirety.

TECHNICAL FIELD

The present invention relates to an electrically heated catalyst device and its manufacturing method.

BACKGROUND ART

In recent years, EHC (electrically heated catalyst) devices have been attracting attention as an exhaust purification device that purifies exhaust gases discharged from engines of automobiles and the like. In EHC devices, it is possible to enhance the efficiency of the purification of the exhaust gas by electrically heating and forcibly activating a catalyst even under the conditions in which the temperature of the exhaust gas is low and hence the catalyst cannot be easily activated, such as immediately after the engine is started.

In an EHC device disclosed in Patent Literature 1, on the outer circumferential surface of a cylindrical catalyst support having a honeycomb structure on which a catalyst such as platinum and palladium is supported, surface electrodes extending in the axial direction of the catalyst support are formed. Further, comb teeth-like wiring lines are connected to the surface electrodes and an electric current is feed therethrough. This current spreads in the catalyst support axial direction in the surface electrodes and hence the entire area of the catalyst support is electrically heated. In this way, the catalyst supported on the catalyst support is activated, and unburned HC (hydrocarbon), CO (carbon monoxide), NOx (nitrogen oxide) and so on contained in the exhaust gas that passes through the catalyst support are removed by the catalytic reaction.

CITATION LIST

Patent Literature

Patent Literature 1: Japanese Unexamined Patent Application Publication No. 2012-066188

SUMMARY OF INVENTION

Technical Problem

The inventors have found the following problem in the above-described electrically heated catalyst devices.

FIG. 8 is a diagram for explaining the problem to be solved by the present invention, and is a horizontal cross section of an example of a structure of a related-art electrically heated catalyst device. As shown in FIG. 8, in this electrically heated catalyst device, a catalyst support 20 including a pair of surface electrodes 30 and wiring line members 4 is covered by an outer cylinder 70 with a mat 60 interposed therebetween. Note that the wiring line members 4 are plate-like members each of which is fixed to a respective one of the pair of surface electrode 30, which are disposed on the outer circumferential surface of the catalyst support 20 so that they are opposed to each other. Since each of the wiring line members 4 is connected to an external electrode (not shown), they are extended to the outside of the outer cylinder 70 through openings 61 of the mat 60 and openings 71 of the outer cylinder 70.

As described above, in the electrically heated catalyst device, it is necessary to extend the wiring line members 4 fixed on the surface electrode 30 to the outside of the outer cylinder 70 through the openings 71 formed on the sides of the outer cylinder 70. Therefore, in the related-art electrically heated catalyst device, the catalyst support 20 is covered by the outer cylinder 70 by welding divided outer semi-cylinders 70a and 70b together as shown in FIG. 8. In the example shown in FIG. 8, flanges 72 are formed in the joint parts of the vertically-divided semi-cylinders 70a and 70b, and the flanges 72 are welded together.

In other words, in the related-art electrically heated catalyst device, an ordinary cylinder (un-divided cylinder) cannot be used as the outer cylinder 70. This is because, since the extension parts of the wiring line members 4 interfere with the outer cylinder 70, the catalyst support 20 including the wiring line members 4 cannot be inserted into the outer cylinder 70.

As explained above, there in a problem in the related-art electrically heated catalyst device that since divided outer semi-cylinders are welded together when the catalyst support is covered by the outer cylinder, its productivity is poor.

The present invention has been made in view of the above-described circumstance, and an object thereof is to provide an electrically heated catalyst device having excellent productivity.

Solution to Problem

An electrically heated catalyst device according to an aspect of the present invention includes:

a catalyst support supporting a catalyst thereon;

a thin plate-like wiring line member fixed on an outer circumferential surface of the catalyst support;

an outer cylinder with an opening formed on its side, the outer cylinder covering the outer circumferential surface of the catalyst support, the opening being configured so that the wiring line member can be pulled out therethrough; and a holding member, the holding member filling up a space between the catalyst support and the outer cylinder and thereby holding the catalyst support, in which the catalyst support is electrically heated through the wiring line member, and a pull-out part of the wiring line member pulled out through the opening is formed in an accordion shape.

In the electrically heated catalyst device according to one aspect of the present invention, since the pull-out part of the wiring line member is formed in the accordion shape, the pull-out part can be folded when the catalyst support is covered by the outer cylinder, thus eliminating the need for welding divided outer semi-cylinders together. As a result, the productivity is improved.

The wiring line member is preferably made of an annealed material having an elongation of 15% or greater. By this feature, the pull-out part can be easily formed into an accordion shape.

It is preferable that: the electrically heated catalyst device further includes a surface electrode extending in an axis direction of the catalyst support on the outer circumferential surface of the catalyst support; the wiring line member is fixed to the surface electrode; and the wiring line member includes: a first wiring line having a comb teeth-like shape, the first wiring line extending in a circumferential direction of the catalyst support and being connected to a central part of the surface electrode in the axial direction; and a second wiring line having a comb teeth-like shape, the second wiring line extending in the axial direction from the first wiring line toward both ends of the surface electrode. By this structure, even when a crack in the catalyst support circumferential direction occurs in the surface electrode, the spread of the electric current in the catalyst support axial direction can be maintained by the second wiring line. This prevents the near-central part of the catalyst support in the axial direction from being intensively heated and hence prevents the near-central part of the catalyst support from cracking due to the thermal stress caused by the intensive heating.

Further, the wiring line member is preferably fixed to the surface electrode by a plurality of button-shaped pieces of a fixing layer, the plurality of button-shaped pieces of the fixing layer being disposed apart from each other on the first and second wiring lines. This structure can reduce the thermal strain (thermal stress).

A method for manufacturing an electrically heated catalyst device according to an aspect of the present invention is a method for manufacturing an electrically heated catalyst device in which a catalyst support supporting a catalyst thereon is electrically heated through a thin plate-like wiring line member, the method including:

a step of fixing the wiring line member on an outer circumferential surface of the catalyst support, a pull-out part of the wiring line member being folded in an accordion shape;

a step of covering the outer circumferential surface of the catalyst support, on which the wiring line member is fixed, by a holding member for holding the catalyst support;

a step of press-fitting the catalyst support covered by the holding member into an outer cylinder; and a step of extending the pull-out part, which is folded in the accordion shape, and thereby pulling out the pull-out part to the outside of the outer cylinder through an opening formed on a side of the outer cylinder.

In the manufacturing method for an electrically heated catalyst device according to one aspect of the present invention, the pull-out part, which is folded in the accordion shape, is pulled out to the outside of the outer cylinder by extending the pull-out part after the catalyst support is press-fitted into the outer cylinder. Therefore, there is no need to weld divided outer semi-cylinders together when the catalyst support is covered by the outer cylinder, thus improving the productivity.

For the wiring line member, an annealed material having an elongation of 15% or greater is preferably used. By this feature, the pull-out part can be easily formed into an accordion shape.

Advantageous Effects of Invention

According to the present invention, it is possible to provide an electrically heated catalyst device having excellent productivity.

DESCRIPTION OF EMBODIMENTS

Specific exemplary embodiments to which the present invention is applied are explained hereinafter in detail with reference to the drawings. However, the present invention is not limited to the exemplary embodiments shown below. Further, for clarifying the explanation, the following descriptions and the drawings are simplified as appropriate.

First Exemplary Embodiment

Figure 1:
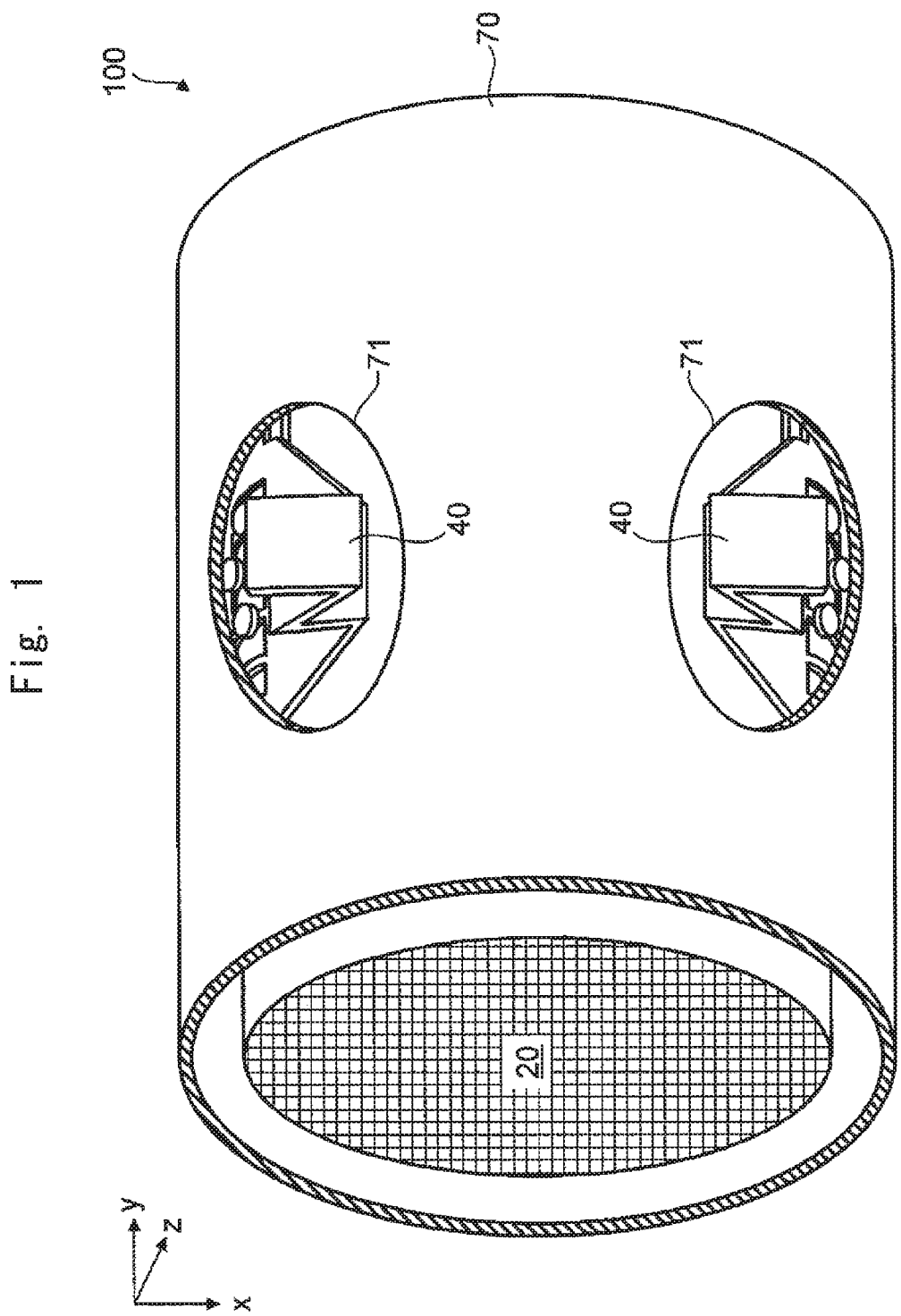
FIG. 1 is a perspective view of an electrically heated catalyst device 100 according to a first exemplary embodiment.
Figure 2:
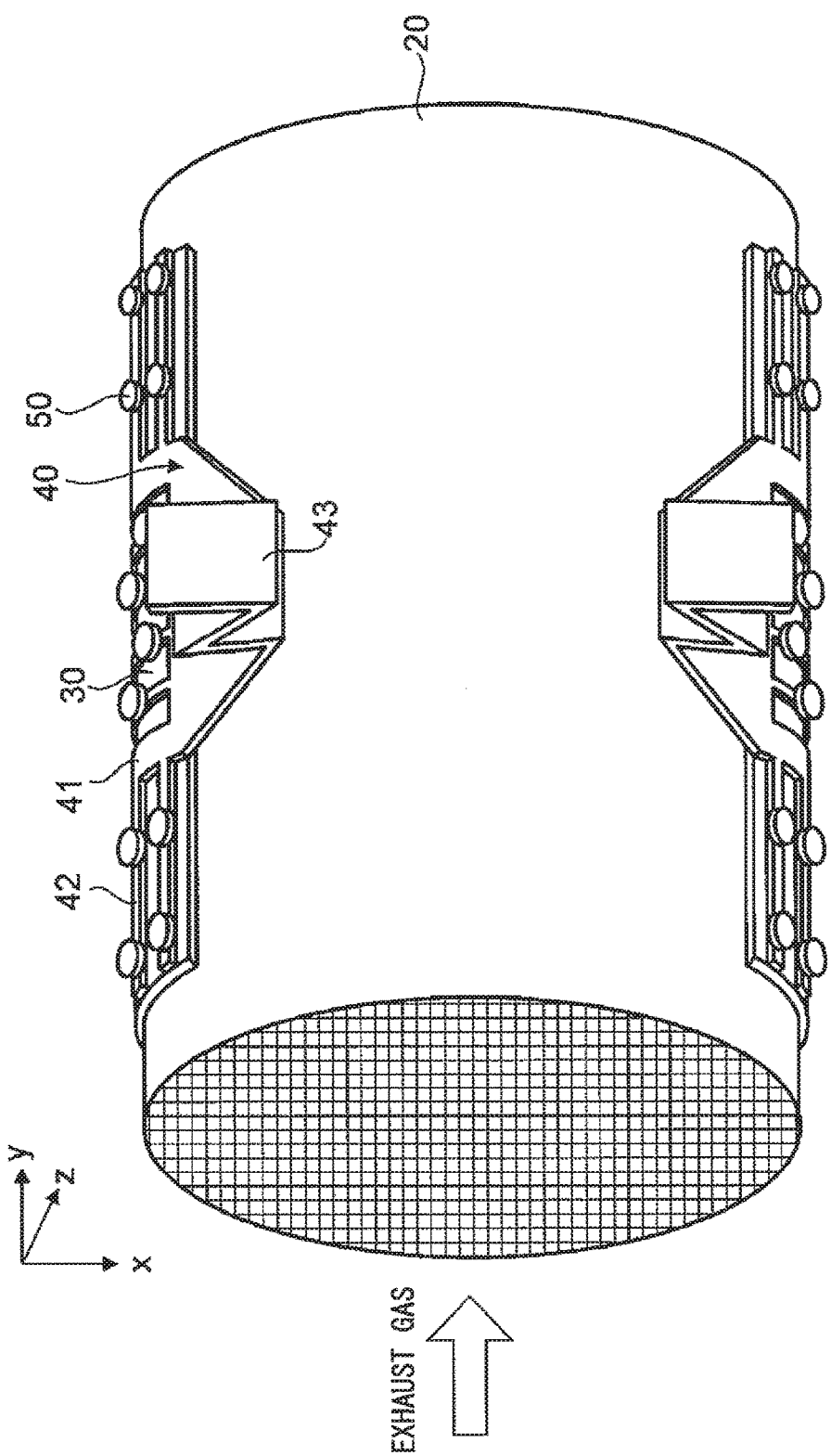
FIG. 2 is a perspective view of the electrically heated catalyst device shown in FIG. 1 in which an outer cylinder 70 is removed.
Figure 3:
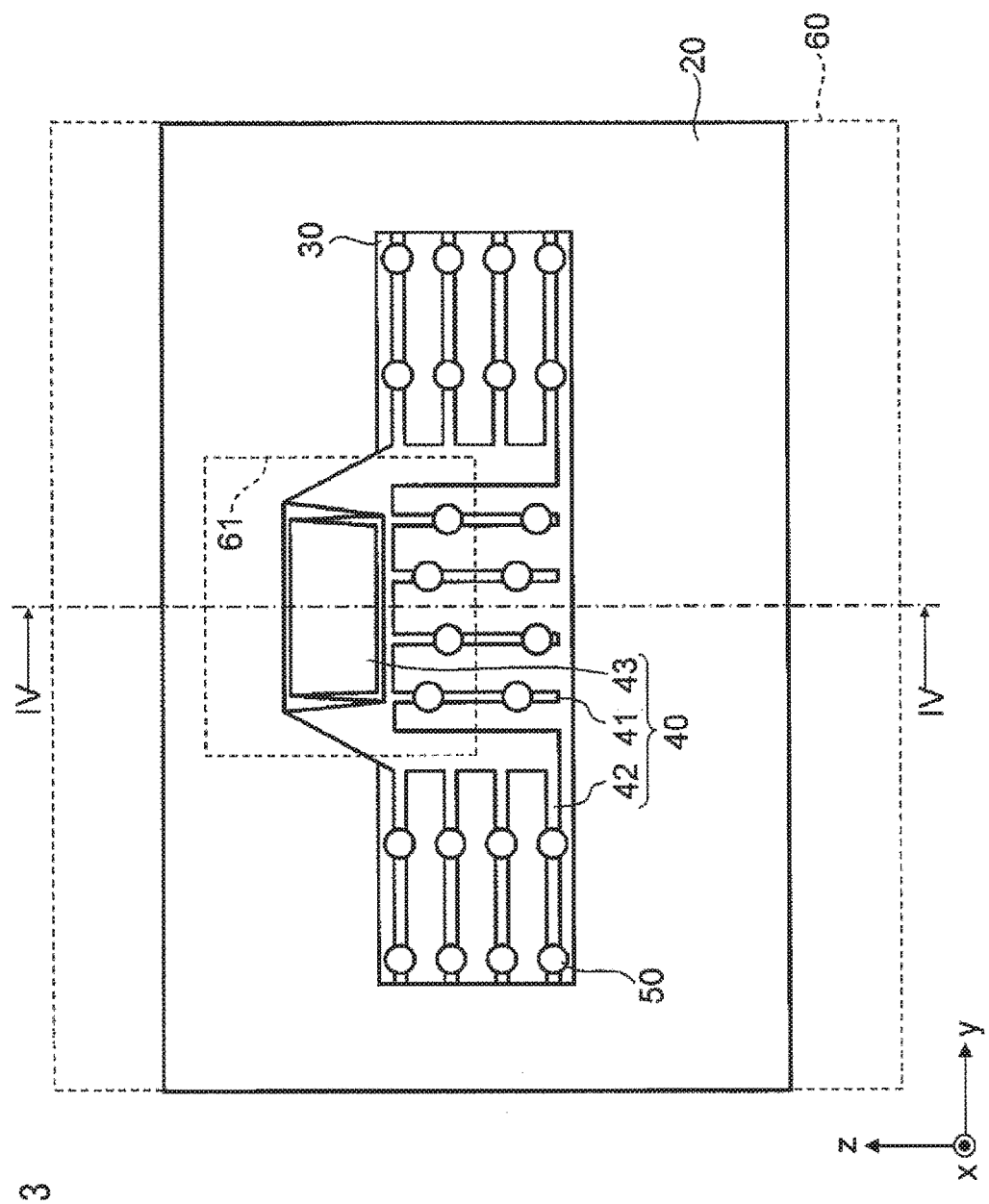
FIG. 3 is a plan view of a surface electrode 30 of the electrically heated catalyst device shown in FIG. 2 as viewed from the above.
Figure 4:
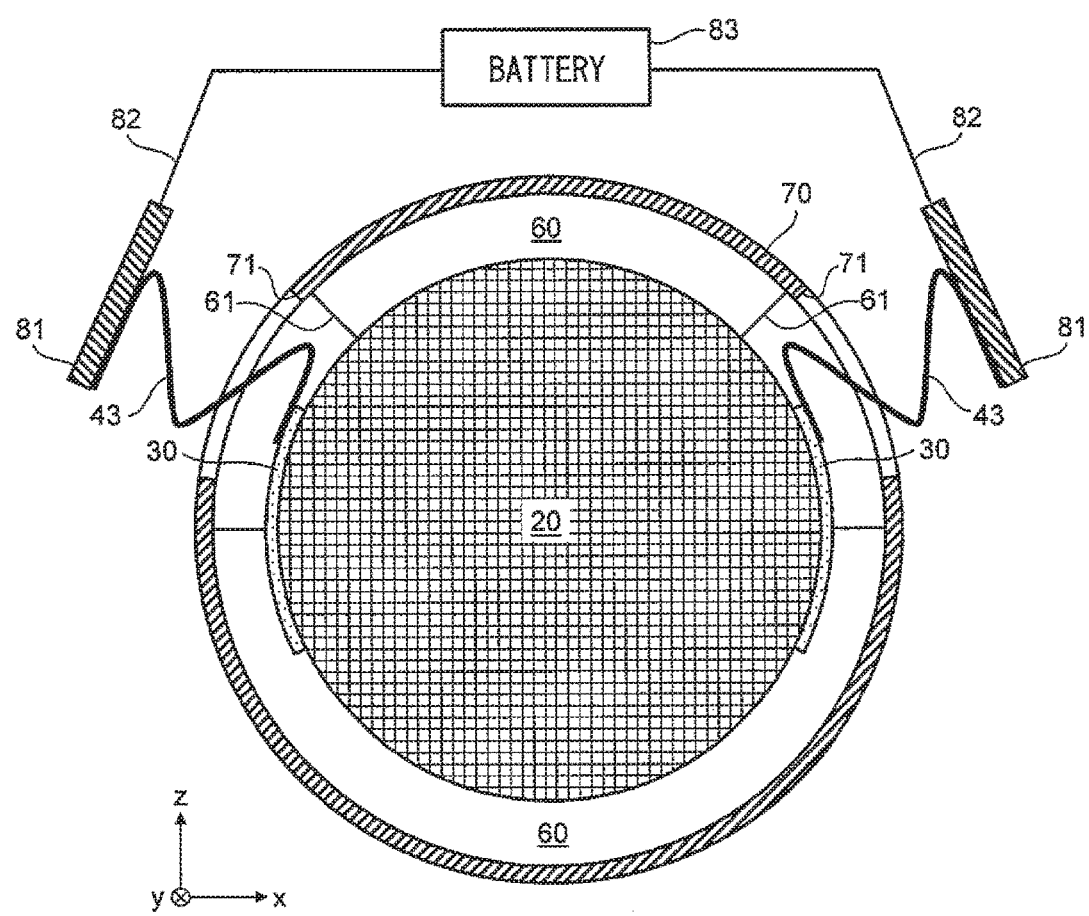
FIG. 4 is a horizontal cross section taken along the line IV-IV in FIG. 3.

Firstly, an electrically heated catalyst device according to a first exemplary embodiment is explained with reference to FIGS. 1 to 4. FIG. 1 is a perspective view of an electrically heated catalyst device 100 according to a first exemplary embodiment. FIG. 2 is a perspective view of the electrically heated catalyst device shown in FIG. 1 in which an outer cylinder 70 is removed. FIG. 3 is a plan view of a surface electrode 30 of the electrically heated catalyst device shown in FIG. 2 as viewed from the above (as viewed from the positive side in the x-axis direction). FIG. 4 is a horizontal cross section taken along the line IV-IV in FIG. 3.

Note that, needless to say, the right-hand xyz-coordinate systems shown in the drawings are shown just for explaining the positional relation among the components. The y-axis direction in the drawings is in parallel with the axial direction of a catalyst support 20. Note that when the electrically heated catalyst device 100 is used, it is preferable that the positive direction in the z-axis direction be conformed to the vertically upward direction as shown in FIG. 4.

The electrically heated catalyst device 100 is disposed, for example, on an exhaust path of an automobile or the like and purifies an exhaust gas discharged from the engine. As shown in FIG. 1, the electrically heated catalyst device 100 includes the catalyst support 20 and the outer cylinder 70. Further, as shown in FIG. 2, the electrically heated catalyst device 100 includes the surface electrodes 30, wiring line members 40, and pieces of a fixing layer 50 on the catalyst support 20. Further, as shown in FIGS. 3 and 4, the electrically heated catalyst device 100 includes a mat 60 between the catalyst support 20 and the outer cylinder 70. That is, the electrically heated catalyst device 100 includes the catalyst support 20, the surface electrodes 30, the wiring line members 40, pieces of the fixing layer 50, the mat 60, and the outer cylinder 70.

Note that the illustration of the mat 60 is omitted in FIG. 1. Further, FIG. 3 shows the positional relation among the catalyst support 20, the wiring line member 40, and the fixing layer 50 for only one of the surface electrodes 30, and these components are also arranged in a similar manner for the other surface electrode 30. Specifically, as shown in FIGS. 2 and 4, the two surface electrodes 30 are mirror-symmetrical to each other with respect to a symmetry plane in parallel with the yz-plane.

The catalyst support 20 is a porous member that supports a catalyst such as platinum and a palladium. Further, since the catalyst support 20 itself is electrically heated, the catalyst support 20 is made of, for example, conductive ceramics, in particular, SiC (silicon carbide). As shown in FIG. 2, the catalyst support 20 has a roughly cylindrical external shape and has a honeycomb structure inside thereof. As indicated by the arrow, an exhaust gas passes through the inside of the catalyst support 20 in the axial direction of the catalyst support 20 (y-axis direction).

As shown in FIG. 2, the surface electrodes 30 are a pair of electrodes that are formed on the outer circumferential surface of the catalyst support 20 and disposed opposite to each other with the catalyst support 20 interposed therebetween. The surface electrodes 30 are physically in contact with and electrically connected to the catalyst support 20. Further, as shown in FIG. 3, each of the surface electrodes 30 has a rectangular planar shape and extends in the catalyst support axial direction (y-axis direction). Note that the surface electrodes 30 are not formed near both ends of the catalyst support in the axial direction. Further, as shown in FIG. 4, the surface electrodes 30 are electrically connected to a battery 83 through the wiring line members 40, external electrodes 81, and external wiring lines 82. With this configuration, an electric current is supplied to the catalyst support 20 and the catalyst support 20 is thereby electrically heated. Note that one of the pair of the surface electrodes 30 serves as a positive pole and the other surface electrode 30 serves as a negative pole. However, either of the surface electrodes 30 can serve as a positive pole or a negative pole. That is, there is no restriction on the direction of the current flowing through the catalyst support 20.

Further, each of the surface electrodes 30 is, for example, a thermal-sprayed film having a thickness of about 50 to 200 μm formed by plasma spraying. Since an electric current flows through the surface electrode 30 as in the case of the wiring line member 40, this thermal-sprayed film needs to be a metal-based film. Regarding a metal for forming the matrix of the thermal-sprayed film, since it needs to be robust enough for use at a high temperature of 800° C. or higher, a metal having excellent oxidation resistance at a high temperature such as a Ni—Cr alloy (with a Cr content of 20 to 60 mass %) and an MCrAlY alloy (M is at least one material selected from Fe, Co and Ni) is preferred. Note that the above-described Ni—Cr alloy and the MCrAlY alloy may contain other alloy elements. The thermal-sprayed film, which constitutes the surface electrodes 30, may be a porous film. The use of a porous thermal-sprayed film improves the ability to reduce stresses.

As shown in FIG. 3, the wiring line members 40 are disposed on their respective surface electrodes 30. As shown in FIG. 3, each of the wiring line members 40 includes comb teeth-like first wiring lines 41 extending in the catalyst support circumferential direction on the surface electrode 30, comb teeth-like second wiring lines 42 extending in the catalyst support axial direction on the surface electrode 30, and a pull-out part 43 that will be connected to an external electrode 81 (FIG. 4). Each of the wiring line members 40 is, for example, a sheet metal having a uniform thickness of about 0.1 mm. The width of each of the first and second wiring lines 41 and 42 is, for example, about 1 mm. Further, the wiring line members 40 are preferably made of, for example, a heat-resistant (oxidation-resistant) alloy such as a stainless-steel-based alloy, a Ni-based alloy, and a Co-based alloy so that they can be used at a high temperature of 800° C. or higher. The use of a stainless-steel-based alloy is preferred in view of its properties, such as electrical conductivity, heat resistance, oxidation resistance at a high temperature, and corrosion resistance in an exhaust-gas atmosphere, as well as its cost.

As shown in FIG. 3, a plurality of the first wiring lines 41 extend in the catalyst support circumferential direction over roughly the entire formation area of the surface electrode 30. Further, all the first wiring lines 41 are connected to the pull-out part 43 at their ends on the positive side in the z-axis direction of the formation area of the surface electrode 30. Further, the plurality of first wiring lines 41 are arranged at roughly regular intervals along the catalyst support axial direction on the surface electrode 30. Further, the first wiring lines 41 are disposed only in the central area of the surface electrode 30 in the catalyst support axial direction. In the example shown in FIG. 3, on each of the surface electrodes 30, six first wiring lines 41 are provided in the central area in the axial direction of the catalyst support 20. Note that the width of the two outermost first wiring lines 41 is larger than that of the other four first wiring lines 41. Note that, needless to say, the number of the first wiring lines 41 is not limited to six and can be determined as desired.

The second wiring lines 42 extend in the catalyst support axial direction from the two outermost first wiring lines 41 to the ends of the surface electrode 30. In the example shown in FIG. 3, four second wiring lines 42 extend from each of the two outermost first wiring lines 41. Note that, needless to say, the number of the second wiring lines 42 is also not limited to any particular number and can be determined as desired.

Each of the first and second wiring lines 41 and 42 is fixed to and electrically connected to the surface electrode 30 by pieces of the fixing layer 50.

Meanwhile, the pull-out part 43 is not fixed to the surface electrode 30 and is extended to the outside of the outer cylinder 70. It should be noted that the pull-out part 43 includes a plurality of bending parts and is formed so that it can be extended and folded. Details of the pull-out part 43 are described later.

In the electrically heated catalyst device 100 according to this exemplary embodiment, the second wiring lines 42 extend to the ends of the surface electrode 30 in the catalyst support axial direction from the first wiring lines 41, which are disposed only in the central area of the surface electrode 30 in the catalyst support axial direction. Therefore, even when a crack in the catalyst support circumferential direction occurs in the surface electrode 30 due to its degradation, the spread of an electric current in the catalyst support axial direction is maintained by the second wiring lines 42. This prevents the near-central part of the catalyst support 20 in the axial direction from being intensively heated and hence prevents the near-central part of the catalyst support from cracking due to the thermal stress caused by the intensive heating.

The pieces of the fixing layer 50 are button-shaped pieces of a thermal-sprayed film having a thickness of about 300 to 500 μm formed on the first and second wiring lines 41 and 42. The fixing layer 50 can be formed by disposing the wiring line member 40 on the surface electrode 30, disposing a masking jig on the wiring line member 40, and performing plasma spraying. The composition of the thermal-sprayed film may be similar to that of the above-described surface electrode 30.

The first and second wiring lines 41 and 42 are fixed to and electrically connected to the surface electrode 30 by the pieces of the fixing layer 50. In the example shown in FIG. 3, each of the inner-side four first wiring lines 41 and the second wiring lines 42 is fixed to the surface electrode 30 by two pieces of the fixing layer 50 which are disposed apart from each other. In other words, the part of each of the first and second wiring lines 41 and 42 located between these neighboring pieces of the fixing layer 50 is not fixed to the surface electrode. This configuration can reduce the thermal strain (thermal stress) that is caused by the difference between the linear expansion coefficient of the surface electrode 30, which is a metal-based thermal-sprayed film, and the fixing layer 50, and that of the catalyst support 20, which is made of ceramics. That is, by forming each piece of the fixing layer 50 as small as possible and scattering them, the aforementioned thermal strain (thermal stress) is reduced. Note that the number of the disposed pieces of the fixing layer 50 and the intervals therebetween may be determined as desired.

The mat (holding member) 60 is a flexible heat insulating member. As indicated by a broken line in FIG. 3, the mat 60 is wound over roughly the entire area of the catalyst support 20. Further, as shown in FIG. 4, the mat 60 fills up a space between the catalyst support 20 and the outer cylinder 70. The catalyst support 20 is fixed to and held by the outer cylinder 70 by using the mat 60 interposed therebetween. Further, the mat 60 has a role of air-tightly containing an exhaust gas and preventing the exhaust gas from leaking to the outside of the outer cylinder 70.

As shown in FIGS. 3 and 4, openings 61 through which the pull-out parts 43 of the wiring line members 40 are extended to the outside of the outer cylinder 70 are formed in the mat 60. The openings 61 are formed in two places in the central area of the catalyst support 20 in the axial direction so that they correspond to the formation places of the respective pull-out parts 43. Further, as shown in FIG. 4 (in the horizontal cross section), the two openings 61 are located in areas slightly above the center of the mat 60 (i.e., on the positive side in the z-axis direction) and disposed so that they are mirror-symmetrical to each other with respect to a symmetry plane in parallel with the yz-plane. Note that although each of the openings 61 has a rectangular shape in the example shown in the drawings, there is no particular restriction on the shape of the openings 61. For example, each of the openings 61 may have a circular shape or an elliptic shape.

Figure 8:
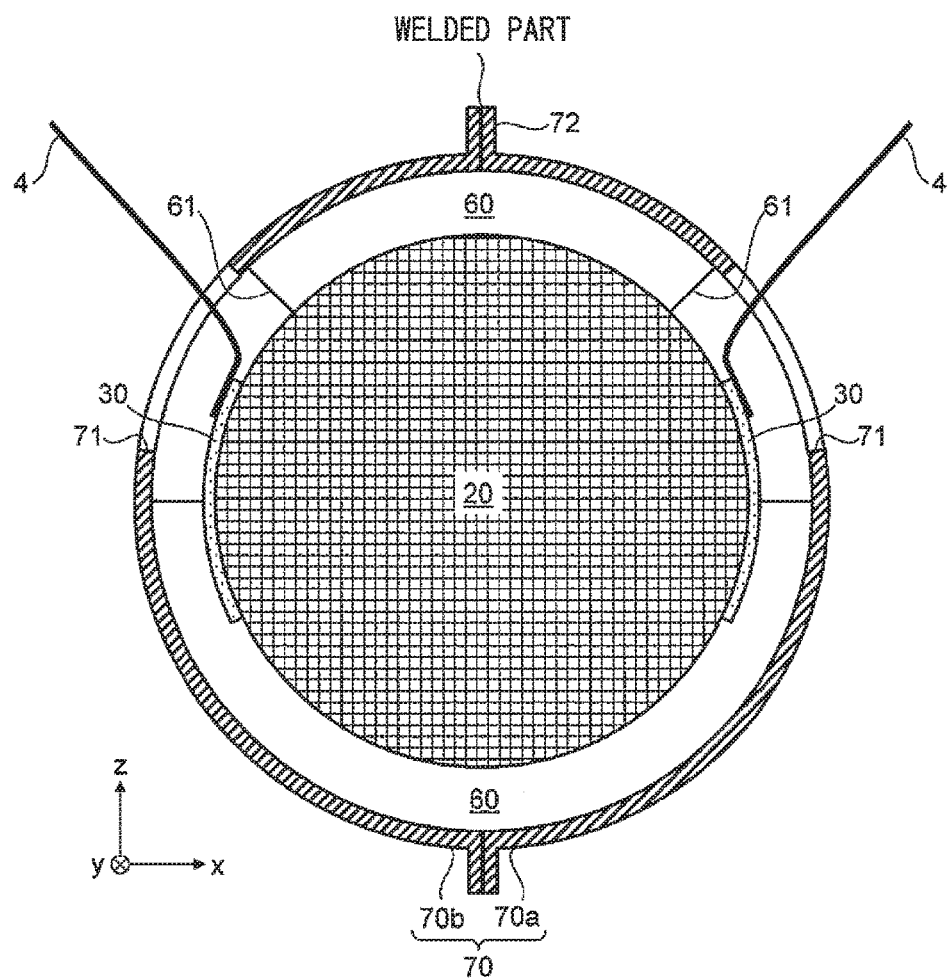
FIG. 8 is a diagram for explaining a problem to be solved by the present invention, and is a horizontal cross section showing an example of a related art electrically heated catalyst device.

The outer cylinder 70 is a casing for accommodating the catalyst support 20 therein, and is a pipe having a diameter slightly larger than that of the cylindrical catalyst support 20. As shown in FIG. 1, the outer cylinder 70 covers roughly the entire area of the catalyst support 20 with the mat 60 interposed therebetween. It should be noted that the outer cylinder 70 is a normal pipe, rather than one that is obtained by welding divided outer semi-cylinders together as shown in FIG. 8. The outer cylinder 70 is preferably made of a metal such as a stainless-steel-based alloy.

As shown in FIGS. 1 and 4, openings 71 through which the pull-out parts 43 of the wiring line members 40 are extended to the outside of the outer cylinder 70 are formed in the outer cylinder 70. Therefore, as shown in FIG. 1, the openings 71 are formed in two places in the central area of the outer cylinder 70 in the axial direction so that they correspond to the formation places of the respective pull-out parts 43. Further, as shown in FIG. 4 (in the horizontal cross section), the two openings 71 are located in areas slightly above the center of the outer cylinder 70 (i.e., on the positive side in the z-axis direction) and disposed so that they are mirror-symmetrical to each other with respect to a symmetry plane in parallel with the yz-plane. Note that although each of the openings 71 has a circular shape in the example shown in the drawings, there is no particular restriction on the shape of the openings 71. For example, each of the openings 71 may have an elliptic shape or a rectangular shape.

With the above-described structure, in the electrically heated catalyst device 100, the catalyst support 20 is electrically heated between the pair of surface electrodes 30 and the catalyst supported on the catalyst support 20 is thereby activated. In this way, unburned HC (hydrocarbon), CO (carbon monoxide), NOx (nitrogen oxide) and so on contained in an exhaust gas that passes through the catalyst support 20 are removed by the catalytic reaction.

One of the features of the electrically heated catalyst device 100 according to the first exemplary embodiment lies in that the pull-out part 43 of the wiring line member 40 includes a plurality of bending parts and is formed so that it can be extended and folded as shown in FIG. 4. In other words, the pull-out part 43 is formed in an accordion shape. Note that the "accordion" means a structure in which an inverted V-fold and a V-fold are alternately repeated. The accordion shape in this specification means including at least one inverted V-fold and at least one V-fold. In the example shown in the drawings, as shown in FIG. 4, for example, the pull-out part 43 includes three bending parts (two inverted V-folds and one V-fold as viewed from the positive side in the z-axis direction). Therefore, the pull-out part 43 is formed in an M-shape in cross section. Alternatively, the pull-out part 43 may include two bending parts (one inverted V-fold and one V-fold) and hence be formed in an N-shape in cross section. Further, the pull-out part 43 may include four or more bending parts.

In the manufacturing stage, the accordion-shaped pull-out parts 43 are in a folded state. Therefore, the pull-out parts 43 of the wiring line members 30 do not interfere with the outer cylinder 70 and the catalyst support 20 including the wiring line members 40 can be inserted into the outer cylinder 70. Then, after the catalyst support 20 is inserted into the outer cylinder 70, the pull-out parts 43 can be easily pulled out to the outside of the outer cylinder 70. That is, in the electrically heated catalyst device 100 according to the first exemplary embodiment, there is no need to weld divided outer semi-cylinders together when the catalyst support 20 is covered by the outer cylinder 70, thus improving the productivity. Note that details of the manufacturing method of the electrically heated catalyst device 100 according to the first exemplary embodiment are described later.

It should be noted that in the related-art electrically heated catalyst device shown in FIG. 8, a thin plate obtained by cold-rolling, i.e., a machine-processed material (having an elongation of about 1%) is used as the wiring line members 4. Therefore, it is difficult to fold the extension parts of the wiring line members 4 into an accordion shape in the manufacturing stage. In contrast to this, in the electrically heated catalyst device 100 according to the first exemplary embodiment, an annealed material (having an elongation of 15% to 20%) obtained by annealing a cold-rolled thin plate is used as the wiring line members 40. Therefore, the pull-out parts 43 can be easily folded into an accordion shape. It should be noted that the elongation of the wiring line members 40 is preferably 15% or greater at the minimum.

Further, though not shown in the drawings, an insulating coating for insulating the outer cylinder 70 from the catalyst support 20 is formed over the entire area of the inner circumferential surface of the outer cylinder 70. However, in the related-art electrically heated catalyst device shown in FIG. 8, it is impossible to form the insulating coating in the welded parts (flanges 70) of the outer cylinder 70. This has caused a problem that when soot contained in the exhaust gas is accumulated in the welded part due to the use, the insulation between the outer cylinder 70 and the catalyst support 20 cannot be ensured. In contrast to this, since the electrically heated catalyst device 100 according to the first exemplary embodiment has no welded part, the insulating coating can be formed over the entire area of the inner circumferential surface of the outer cylinder 70, thus making it possible to ensure the insulation between the outer cylinder 70 and the catalyst support 20.

Figure 5:
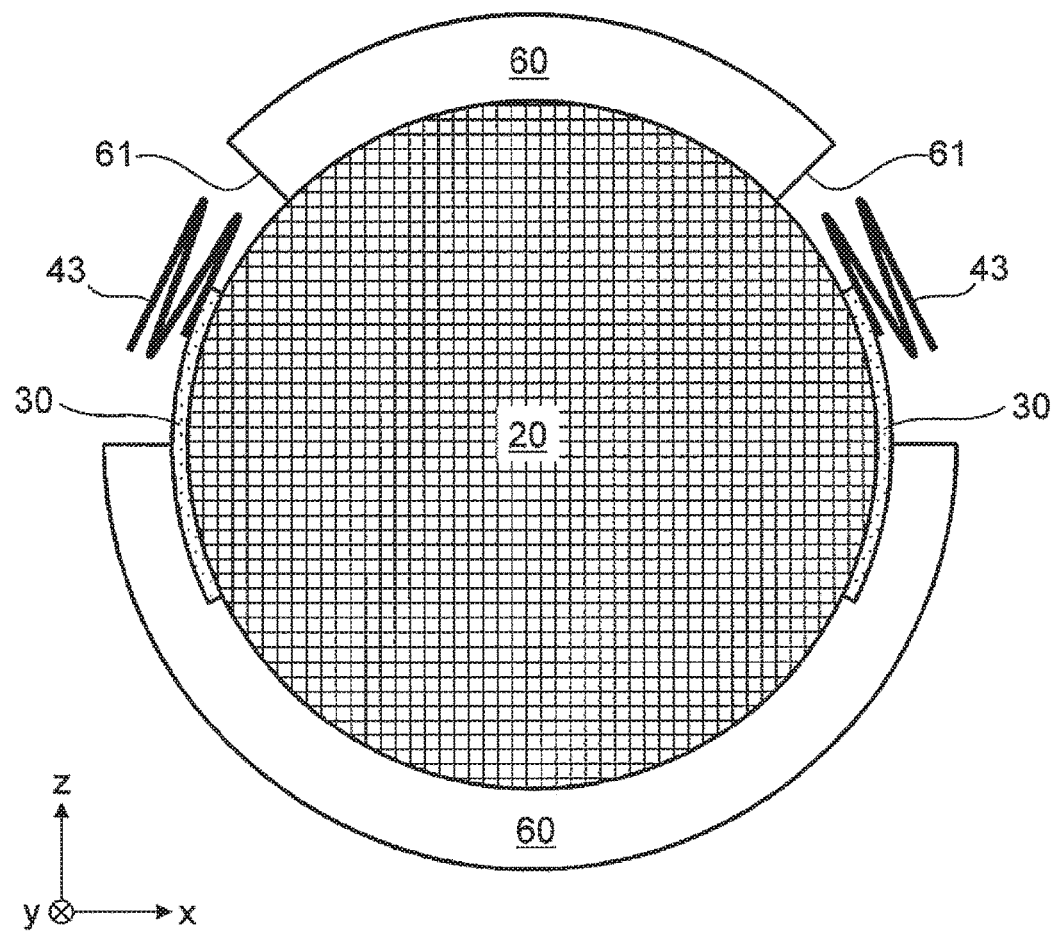
FIG. 5 is a horizontal cross section for explaining a manufacturing method of an electrically heated catalyst device 100 according to the first exemplary embodiment.
Figure 6:
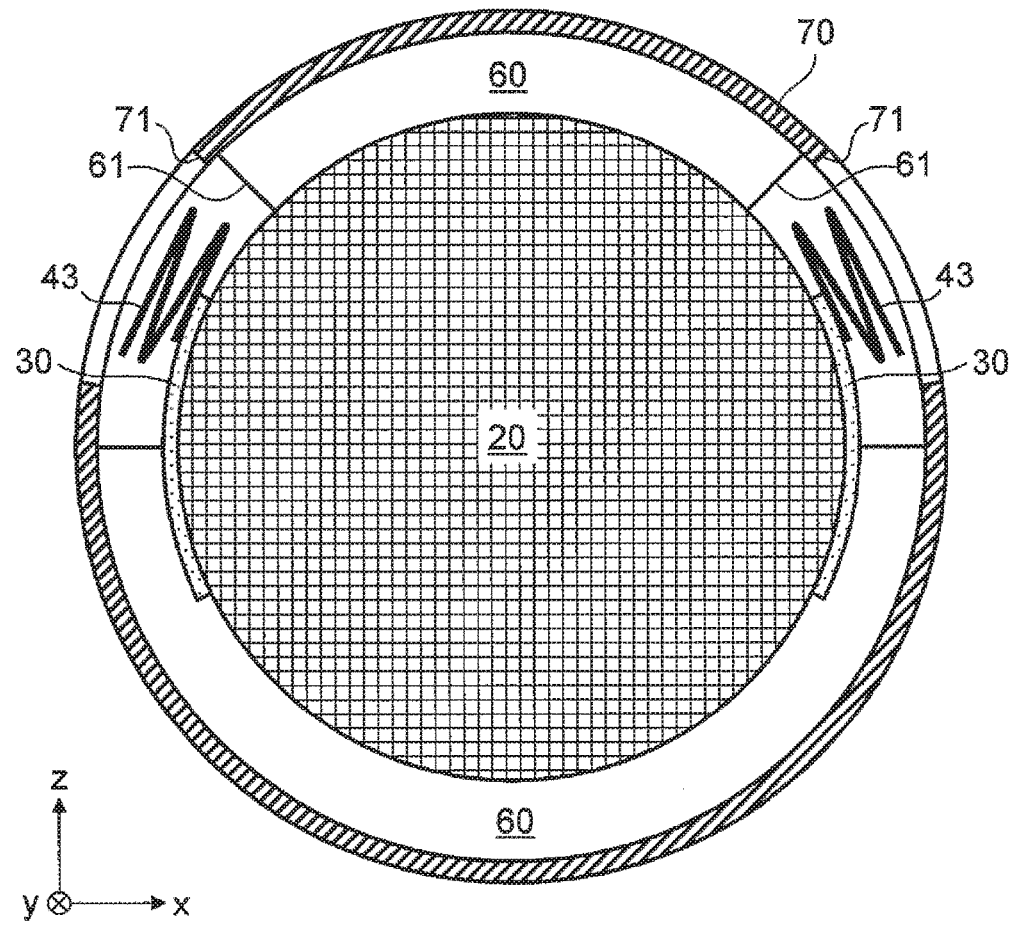
FIG. 6 is a horizontal cross section for explaining the manufacturing method of the electrically heated catalyst device 100 according to the first exemplary embodiment.

Next, a manufacturing method of an electrically heated catalyst device 100 according to the first exemplary embodiment is explained with reference to FIGS. 5 and 6. FIGS. 5 and 6 are horizontal cross sections for explaining a manufacturing method of an electrically heated catalyst device 100 according to the first exemplary embodiment. FIGS. 5 and 6 correspond to the horizontal cross section shown in FIG. 4.

Firstly, as shown in FIG. 5, surface electrodes 30 are formed on the surface of a catalyst support 20 by, for example, plasma spraying.

Next, wiring line members 40, each of which includes a pull-out part 43 folded into an accordion shape, are disposed on the surface electrodes 30. Then, pieces of a fixing layer 50 are formed on the wiring line members 40 by plasma spraying using a masking jig. As a result, the wiring line members 40 are fixed on the surface electrodes 30.

Next, as shown in FIG. 5, a mat 60 is wound over the outer circumferential surface of the catalyst support 20, in which the surface electrodes 30, the wiring line members 40, and the pieces of the fixing layer 50 were formed. It is preferable that openings 61 are formed in advance in the mat 60. Note that as shown in FIG. 5, the pull-out parts 43 are still folded in an accordion shape.

Next, as shown in FIG. 6, the catalyst support 20, around which the mat 60 was wound, is press-fitted into an outer cylinder 70.

Figure 7:
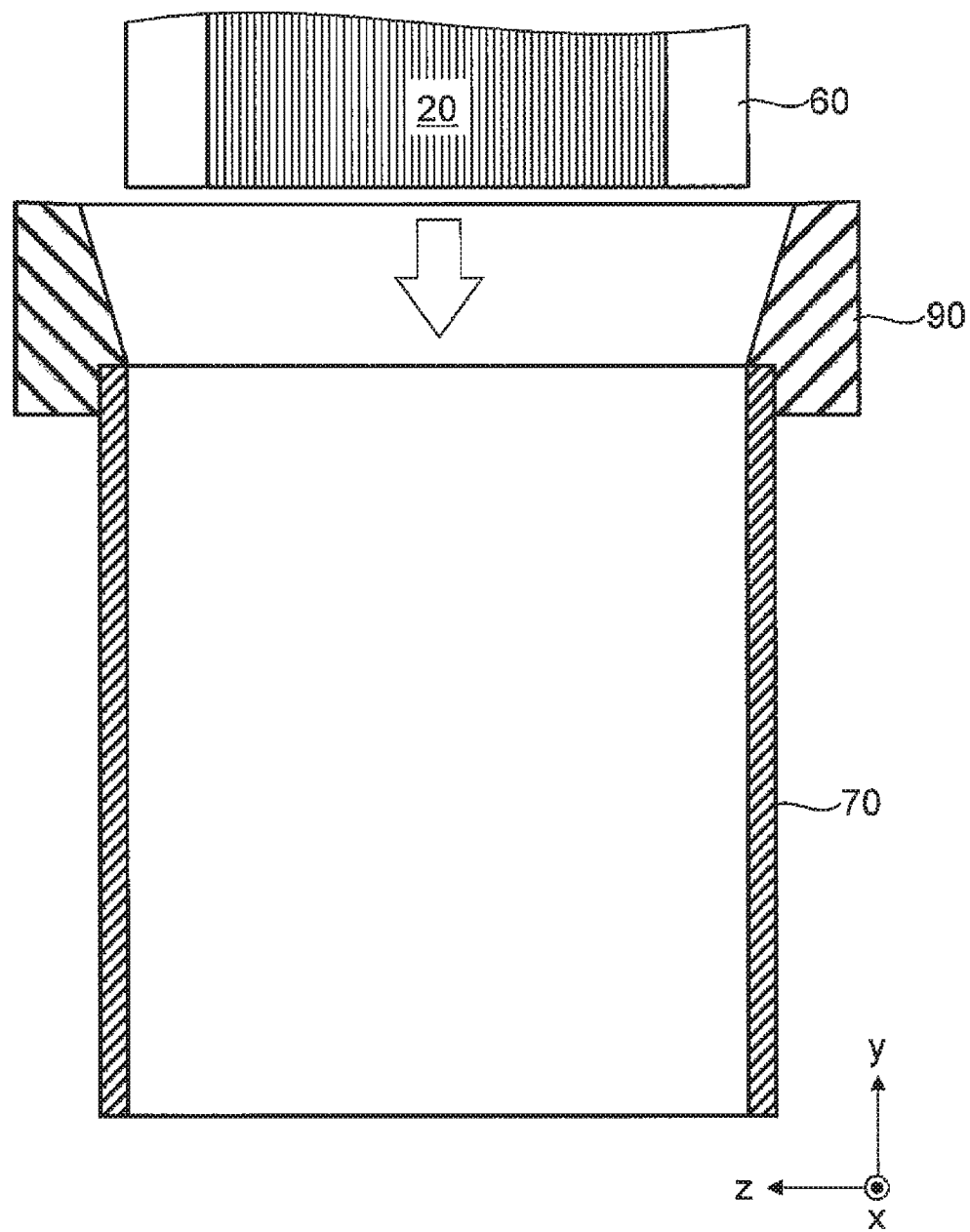
FIG. 7 is a vertical cross section showing a state where a catalyst support 20 is press-fitted into an outer cylinder 70.

Note that FIG. 7 is a vertical cross section showing a state where the catalyst support 20 is press-fitted into the outer cylinder 70. As shown in FIG. 7, a ring-shaped press-fitting guide 90 is disposed at the top end (the end on the positive side in the y-axis direction) of the outer cylinder 70. To allow the catalyst support 20 with mat 60 wound thereon to be inserted from the top side (the positive side in the y-axis positive direction) of the press-fitting guide 90, the inner circumferential surface of the press-fitting guide 90 is formed in a tapered shaped in such a manner that its diameter increases in the upward direction (the y-axis positive direction). A cut-out part that engages with the outer cylinder 70 is formed on the bottom end (the end on the negative side in the y-axis direction) of the inner circumferential surface of the press-fitting guide 90. Note that as shown in FIG. 7, it is preferable to conform the axial direction (the y-axis direction) of the catalyst support 20 to the vertical direction when the catalyst support 20 is press-fitted into the outer cylinder 70.

Next, by extending the pull-out parts 43, which were folded into the accordion shape, the pull-out parts 43 are pulled out to the outside of the outer cylinder 70 through the openings 71.

Finally, the pull-out parts 43 are fixed to external electrodes 81 by using screws, welding, or other means.

Through the above-described processes, the electrically heated catalyst device 100 according to the first exemplary embodiment can be obtained as shown in FIG. 4.

As described above, in the manufacturing method of the electrically heated catalyst device 100 according to the first exemplary embodiment, the pull-out parts 43 are folded in an accordion shape when the catalyst support 20 with the mat 60 wound thereon is press-fitted into the outer cylinder 70. Specifically, as shown in FIG. 5, the pull-out parts 43 are folded and stored in the openings 61 of the mat 60. Therefore, as shown in FIG. 6, the pull-out parts 43 do not interfere with the outer cylinder 70 and the catalyst support 20 including the wiring line members 40 can be inserted into the outer cylinder 70. Then, as shown in FIG. 4, after the catalyst support 20 is inserted into the outer cylinder 70, the pull-out parts 43 can be easily pulled out to the outside of the outer cylinder 70. That is, in the manufacturing method of the electrically heated catalyst device 100 according to the first exemplary embodiment, there is no need to weld divided outer semi-cylinders together when the catalyst support 20 is covered by the outer cylinder 70, thus improving the productivity.

Note that the present invention is not limited to the above-described exemplary embodiments, and various modifications can be made without departing from the spirit of the present invention.

This application is based upon and claims the benefit of priority from Japanese patent application No. 2013-251128, filed on Dec. 4, 2013, the disclosure of which is incorporated herein in its entirety by reference.

REFERENCE SIGNS LIST

20 Catalyst Support
30 Surface Electrode
40 Wiring Line Members
41 First Wiring Line
42 Second Wiring Line
43 Pull-Out Part
50 Fixing Layer
60 Mat
61 Openings
70 Outer Cylinder
71 Openings
81 External Electrode
82 External Wiring Line
83 Battery
90 Press-Fitting Guide
100 Electrically Heated Catalyst Device

The invention claimed is:
1. An electrically heated catalyst device comprising:
a catalyst support supporting a catalyst thereon;
a thin plate-like wiring line member fixed on an outer circumferential surface of the catalyst support;
an outer cylinder with an opening formed on its side, the outer cylinder covering the outer circumferential surface of the catalyst support, the opening being configured so that the wiring line member can be externally pulled out therethrough; and a holding member, the holding member filling up a space between the catalyst support and the outer cylinder and thereby holding the catalyst support, wherein the catalyst support is electrically heated through the wiring line member, a pull-out part of the wiring line member pulled out through the opening is formed in an accordion shape, the pull-out part configured to be folded such that a thickness of the folded pull-out part is equal to or less than a thickness of the holding member, and the pull-out part is formed such that the pull-out part is configured to be pulled out to an outside of the outer cylinder through the opening.

2. The electrically heated catalyst device according to claim 1, wherein the wiring line member is made of an annealed material having an elongation of 15% or greater.

3. The electrically heated catalyst device according to claim 1, further comprising a surface electrode extending in an axis direction of the catalyst support on the outer circumferential surface of the catalyst support, wherein the wiring line member is fixed to the surface electrode, and the wiring line member comprises:

a first wiring line having a comb teeth-like shape, the first wiring line extending in a circumferential direction of the catalyst support and being connected to a central part of the surface electrode in the axial direction; and a second wiring line having a comb teeth-like shape, the second wiring line extending in the axial direction from the first wiring line toward both ends of the surface electrode.

4. The electrically heated catalyst device according to claim 3, wherein the wiring line member is fixed to the surface electrode by a plurality of button-shaped pieces of a fixing layer, the plurality of button-shaped pieces of the fixing layer being disposed apart from each other on the first and second wiring lines.

5. A method for manufacturing an electrically heated catalyst device in which a catalyst support supporting a catalyst thereon is electrically heated through a thin plate-like wiring line member, the method comprising:

a step of fixing the wiring line member on an outer circumferential surface of the catalyst support, a pull-out part of the wiring line member being folded in an accordion shape;

a step of covering the outer circumferential surface of the catalyst support, on which the wiring line member is fixed, by a holding member for holding the catalyst support, wherein a thickness of the folded pull-out part is equal to or less than a thickness of the holding member;

a step of press-fitting the catalyst support covered by the holding member into an outer cylinder; and a step of extending the pull-out part, which is folded in the accordion shape, and thereby pulling out the pull-out part to the outside of the outer cylinder through an opening formed on a side of the outer cylinder.

6. The method for manufacturing an electrically heated catalyst device according to claim 5, wherein the wiring line member is made of an annealed material having an elongation of 15% or greater.

* * * * *